US010017087B2

(12) United States Patent
Dry et al.

(10) Patent No.: US 10,017,087 B2
(45) Date of Patent: Jul. 10, 2018

(54) SELF-LOCKING HINGE ASSEMBLY FOR VEHICLE SWINGING DESK TOP

(71) Applicant: Ford Global Technologies, LLC, Dearborn, MI (US)

(72) Inventors: Alan George Dry, Grosse Pointe Woods, MI (US); Marcos Silva Kondrad, Macomb Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 94 days.

(21) Appl. No.: 15/227,138

(22) Filed: Aug. 3, 2016

(65) Prior Publication Data

US 2018/0037149 A1   Feb. 8, 2018

(51) Int. Cl.
*B60N 3/00*   (2006.01)
*E05D 11/00*   (2006.01)
*E05D 11/10*   (2006.01)

(52) U.S. Cl.
CPC .............. *B60N 3/004* (2013.01); *E05D 11/00* (2013.01); *E05D 11/1007* (2013.01); *E05D 11/1028* (2013.01)

(58) Field of Classification Search
CPC .. B60N 11/0638; B60N 11/002; B60N 2/206; B60N 3/004; A47C 7/68; A47B 5/00; B60D 11/0638
USPC .... 108/44, 139, 94; 297/146, 147, 145, 154, 297/163, 164, 354.12, 364; 248/240.4
See application file for complete search history.

(56) References Cited

U.S. PATENT DOCUMENTS

| | | | |
|---|---|---|---|
| 577,145 A * | 2/1897 | McKeag | A47B 23/046 108/49 |
| 2,522,602 A | 9/1950 | Burns | |
| 3,345,118 A | 10/1967 | Cummings | |
| 3,408,104 A | 10/1968 | Raynes | |
| 3,423,785 A | 1/1969 | Pickles | |
| 3,641,946 A * | 2/1972 | Charnay | A47B 27/00 108/6 |
| 4,025,109 A | 5/1977 | Klingelhoefer et al. | |
| 4,359,004 A | 11/1982 | Chappell | |
| 4,371,206 A * | 2/1983 | Johnson, Jr. | A47D 13/102 294/140 |
| 4,566,150 A | 1/1986 | Boothe | |
| 5,788,324 A * | 8/1998 | Shea | B60N 2/462 297/113 |
| 5,788,325 A | 8/1998 | Ganot | |
| 6,059,358 A * | 5/2000 | Demick | B60N 2/206 297/125 |
| 6,325,458 B1 | 12/2001 | Rohee et al. | |
| 6,394,551 B1 | 5/2002 | Beukema | |
| 6,860,550 B2 * | 3/2005 | Wojcik | B60N 2/206 108/44 |
| 7,303,226 B2 | 12/2007 | Bernstein et al. | |
| 7,520,552 B2 * | 4/2009 | Nakamura | B60R 7/04 108/44 |

(Continued)

*Primary Examiner* — Jose V Chen
(74) *Attorney, Agent, or Firm* — Vichit Chea; Price Heneveld LLP

(57) ABSTRACT

A vehicle seating assembly includes a vehicle desk operably coupled to a rear portion of a seatback. The vehicle desk is movable between at least a stowed position and a use position. A hinge assembly includes a finger-grip rotator knob assembly and a moveable element, such as a working surface or desk. The moveable element is operably coupled to, and rotatable with, the finger-grip rotator knob assembly.

20 Claims, 15 Drawing Sheets

(56) References Cited

U.S. PATENT DOCUMENTS

| | | | | |
|---|---|---|---|---|
| 7,607,726 B2* | 10/2009 | Orlo | ............. | B60N 3/004 |
| | | | | 248/421 |
| 7,793,597 B2* | 9/2010 | Bart | ............. | B60N 3/002 |
| | | | | 108/44 |
| 8,167,366 B2* | 5/2012 | Charpentier | ......... | B60N 3/004 |
| | | | | 297/125 |
| 8,517,464 B2* | 8/2013 | Ruiz | ............. | B60N 3/004 |
| | | | | 297/146 |
| 8,833,847 B2* | 9/2014 | Nishiyama | ............. | B60N 2/36 |
| | | | | 297/112 |
| 8,894,121 B2* | 11/2014 | Eilers | ............. | B60N 3/001 |
| | | | | 108/44 |
| 9,290,112 B2* | 3/2016 | Rouxel | ............. | B60N 3/001 |
| 9,758,064 B1* | 9/2017 | Dry | ............. | B60N 2/206 |
| 2010/0319588 A1* | 12/2010 | Hanna | ............. | B64D 11/06 |
| | | | | 108/20 |
| 2011/0048289 A1 | 3/2011 | Pietila et al. | | |
| 2013/0001988 A1* | 1/2013 | Lucas | ............. | B60N 2/36 |
| | | | | 297/167 |
| 2015/0284088 A1* | 10/2015 | Gow | ............. | B64D 11/0638 |
| | | | | 297/174 R |
| 2015/0321592 A1* | 11/2015 | De Morais | ............. | B64D 11/06 |
| | | | | 297/147 |
| 2017/0002972 A1* | 1/2017 | Parker | ............. | B60R 11/0235 |

\* cited by examiner

US 10,017,087 B2

SELF-LOCKING HINGE ASSEMBLY FOR VEHICLE SWINGING DESK TOP

FIELD OF THE INVENTION

The present disclosure generally relates to a hinge assembly. More specifically, the present disclosure relates to a self-locking hinge assembly.

BACKGROUND OF THE INVENTION

Many industries utilize transportation vehicles as mobile offices. For example, delivery drivers, contractors, and various other tradesmen are constantly moving from one appointment or delivery to the next. Paperwork of various types is frequently completed between appointments or deliveries. Completion of this paperwork can be difficult and uncomfortable when improvising a working surface in the vehicle.

SUMMARY OF THE INVENTION

According to one aspect of the present disclosure, a vehicle seating assembly includes a seatback and a hinge assembly. The hinge assembly includes a finger-grip rotator knob assembly that is movable between at least a stowed position and a use position. The vehicle seating assembly further includes a mounting plate. The mounting plate has a first side operably coupled to the seatback and a second side operably coupled to the hinge assembly. A desk is operably coupled to the hinge assembly and disposed between the second side of the mounting plate and the hinge assembly.

According to another aspect of the present disclosure, a seating assembly includes a seatback with a mounting plate that has a first side operably coupled to the seatback and a second side operably coupled to a hinge assembly, wherein the hinge assembly includes a finger-grip rotator knob assembly and a desk. The desk is disposed between the second side of the mounting plate and the hinge assembly. The desk is operably coupled to the hinge assembly.

According to yet another aspect of the present disclosure, a hinge assembly includes a finger-grip rotator knob assembly and a mounting plate. The mounting plate has a first side operably coupled to a mounting surface and a second side operably coupled to the finger-grip rotator knob assembly. A movable element is disposed between the finger-grip rotator knob assembly and the mounting plate. The movable element is operably coupled to, and rotatable with, the finger-grip rotator knob assembly.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
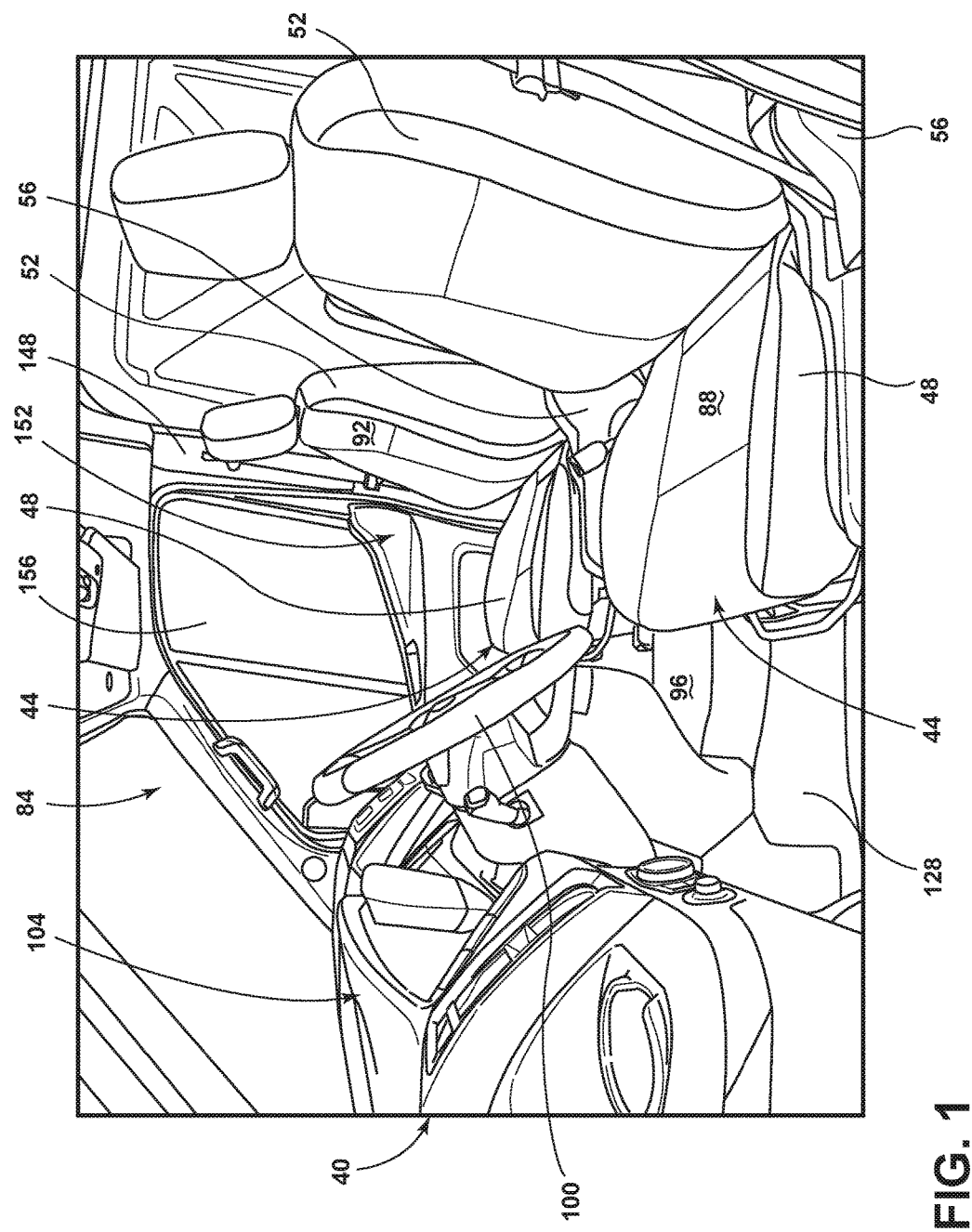
FIG. 1 is a side perspective view of an interior of a vehicle equipped with a seating arrangement.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle desk. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-12, reference numeral 40 generally designates a passenger vehicle such as an automotive wheeled vehicle. Additionally, a pair of vehicle seating assemblies 44 are shown that each includes a base 48 and a seatback 52. The seatback 52 is operably coupled to the base 48 by a pitch joint 56 capable of pivotally adjusting the seatback 52 relative to the base 48 about a pitch axis 60 to a user-selected pitch angle Φ. A movable element, such as a vehicle desk 64, is operably coupled to a rear portion 68 of one of the seatbacks 52 and capable of rotational motion about a hinge assembly 72 to pivot between a stowed position shown in FIG. 8 and a use position 76 shown in FIG. 9. In one embodiment, the vehicle desk 64 can remain locked in the use position 76 without user (e.g., driver) 80 interaction after initial setup. That is, the hinge assembly 72 can be self-locking and as such is prevented from rotating when the user 80 does not intend to rotate the vehicle desk 64 (i.e. while the vehicle 40 is in motion). The vehicle 40 may be configured as a cargo van according to one embodiment; however, it is contemplated that other vehicle types can be used without departing from the concepts disclosed herein. For example, the disclosed concepts can be used in coupes, sedans, station wagons, cargo wagons, mini-vans, full size vans, sport utility vehicles, trucks, and the like.

Figure 2:
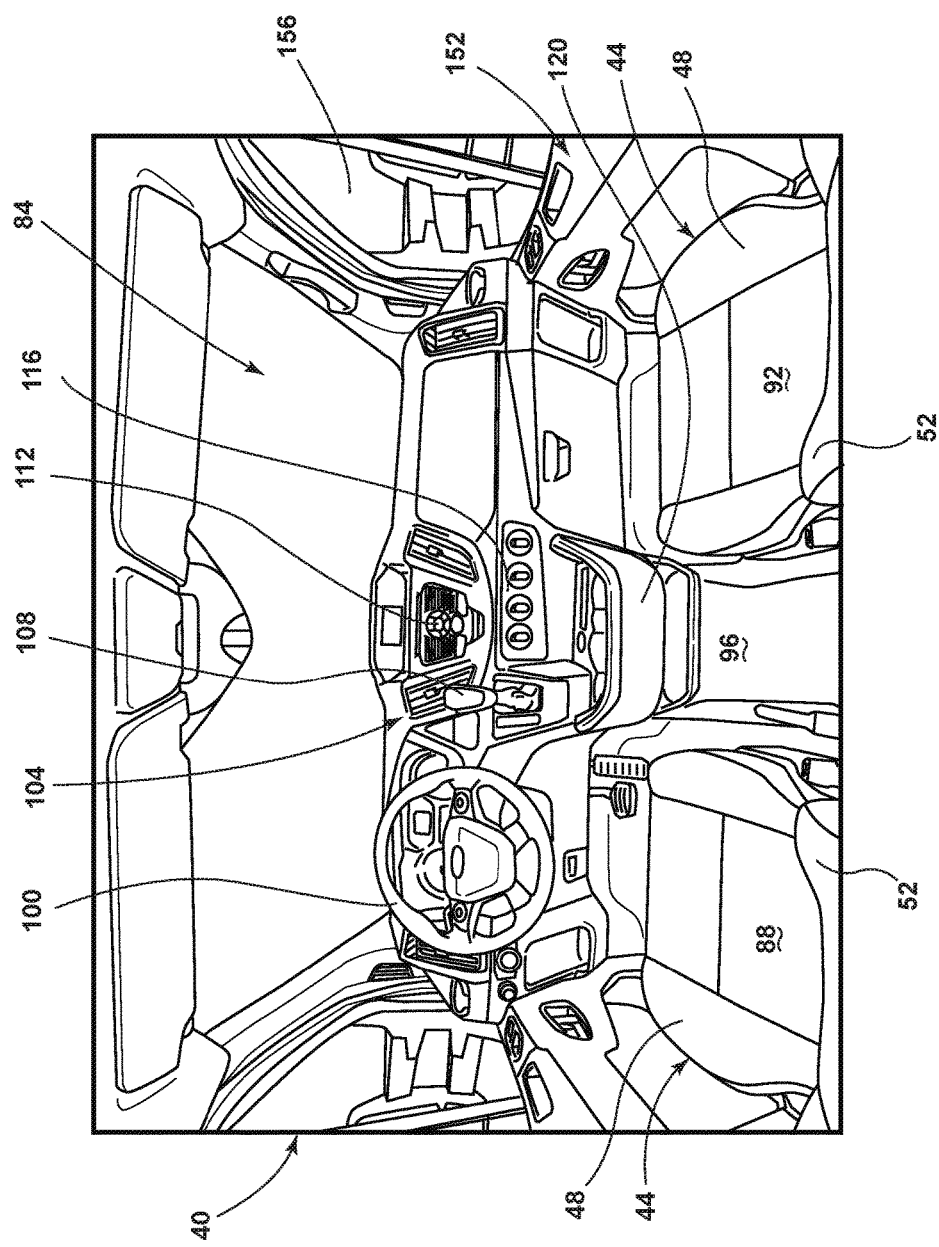
FIG. 2 is a rear perspective view of the interior of the vehicle.

Referring now to FIGS. 1 and 2, reference numeral 84 generally designates an interior of the vehicle 40. The interior 84 of the vehicle 40, as shown, includes a driver seat 88 and a passenger seat 92 disposed in a side-by-side configuration. The driver seat 88 and the passenger seat 92 are located in a front portion 96 of the vehicle 40. The driver seat 88 and the passenger seat 92 each include the base 48 and the seatback 52. A steering wheel 100 is disposed in front of the driver seat 88. The steering wheel 100 is operably coupled to a dashboard assembly 104.

Referring now to FIG. 2, the interior 84 of the vehicle 40 is shown from the perspective of a rear seated occupant of the vehicle 40 looking forward. The dashboard assembly 104 includes a shifter 108, radio controls 112, climate controls 116, and a beverage holding area 120 generally position forward of the seats 88 and 92.

Figure 3:
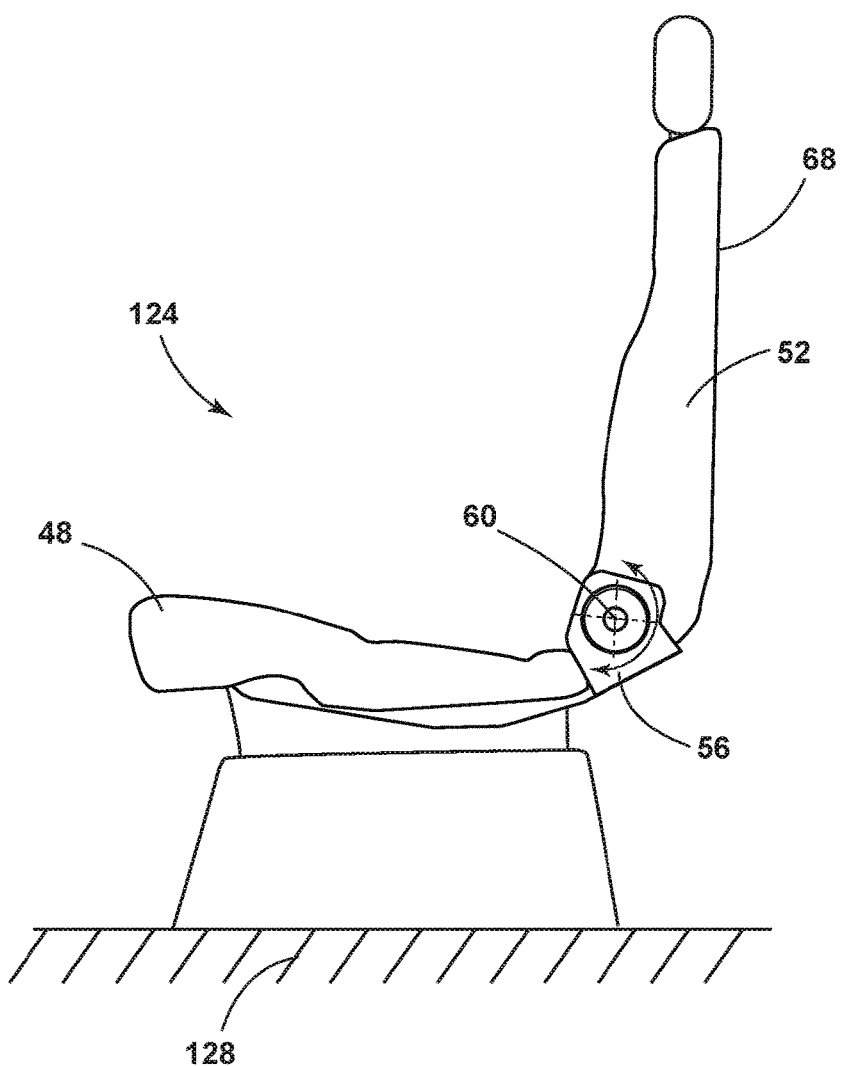
FIG. 3 is a side perspective view of a vehicle seat in an upright open position.
Figure 4:
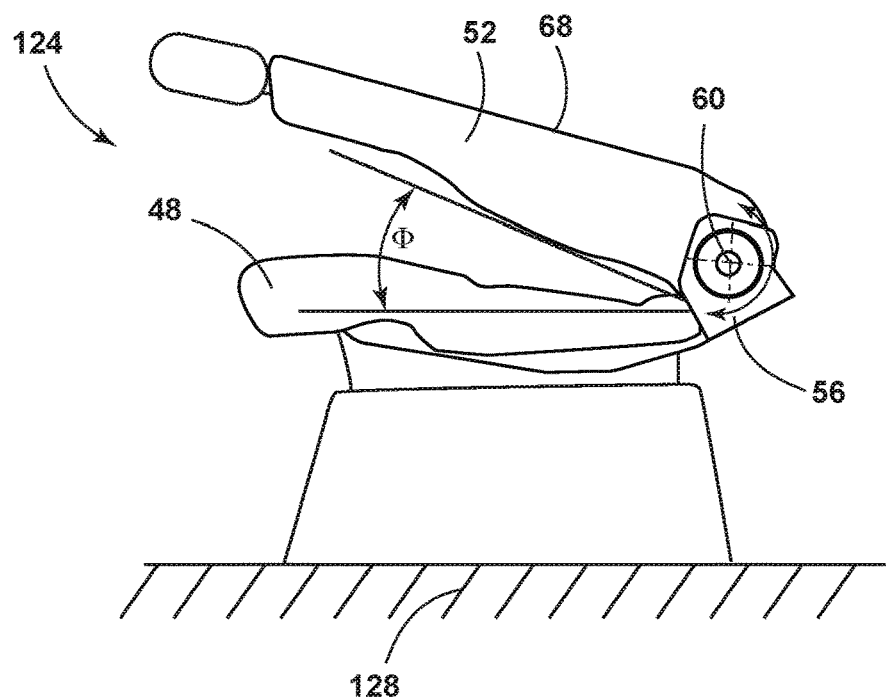
FIG. 4 is a side perspective view of the vehicle seat of FIG. 3 in a forward-pitched position.
Figure 5:
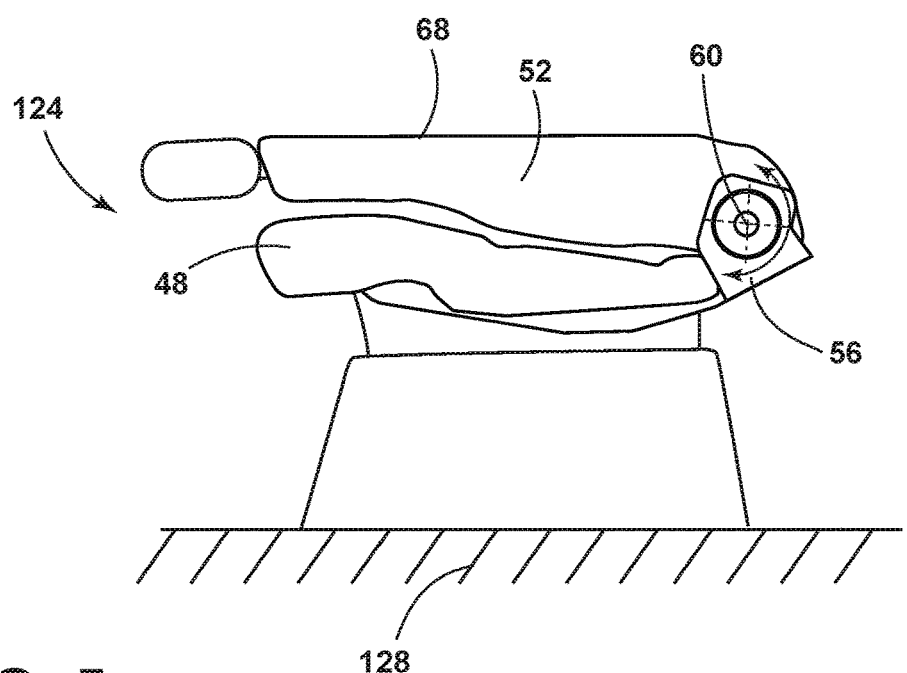
FIG. 5 is a side perspective view of the vehicle seat of FIG. 3 in a folded closed position.

Referring now to FIGS. 3-5, a vehicle seat 124 is generally shown without the vehicle desk 64. The vehicle seat 124 includes the base 48 and the seatback 52. The base 48 is operably coupled to a floor 128 of the interior 84 (FIGS. 1 and 2) of the vehicle 40. The seatback 52 is operably coupled to the base 48 by a pitch joint 56. The pitch joint 56 can adjust the seatback 52 relative to the base 48 about the pitch axis 60 to the user-selected pitch angle Φ. The user-selected pitch angle Φ can be any angular displacement the user 80 (FIG. 10) selects. The user-selected pitch angle Φ may be approximately twenty degrees (20°) for optimal deployment and use of the vehicle desk 64.

Figure 9:
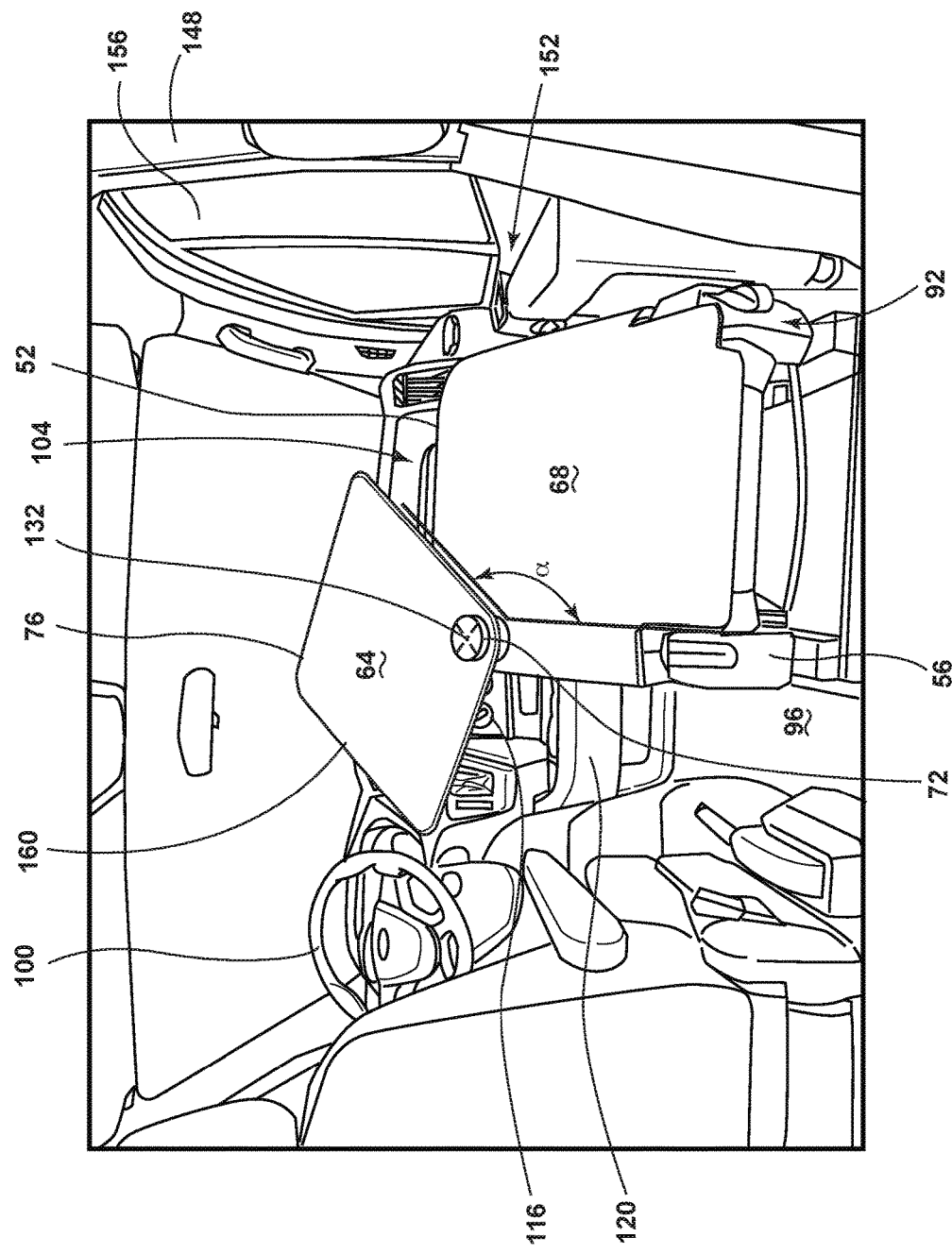
FIG. 9 is a rear perspective view of the vehicle seat in the forward-pitched position equipped with one embodiment of the passenger seat mounted desk, similar to FIG. 7, where the passenger seat mounted desk is in a deployed, or user, position.
Figure 10:
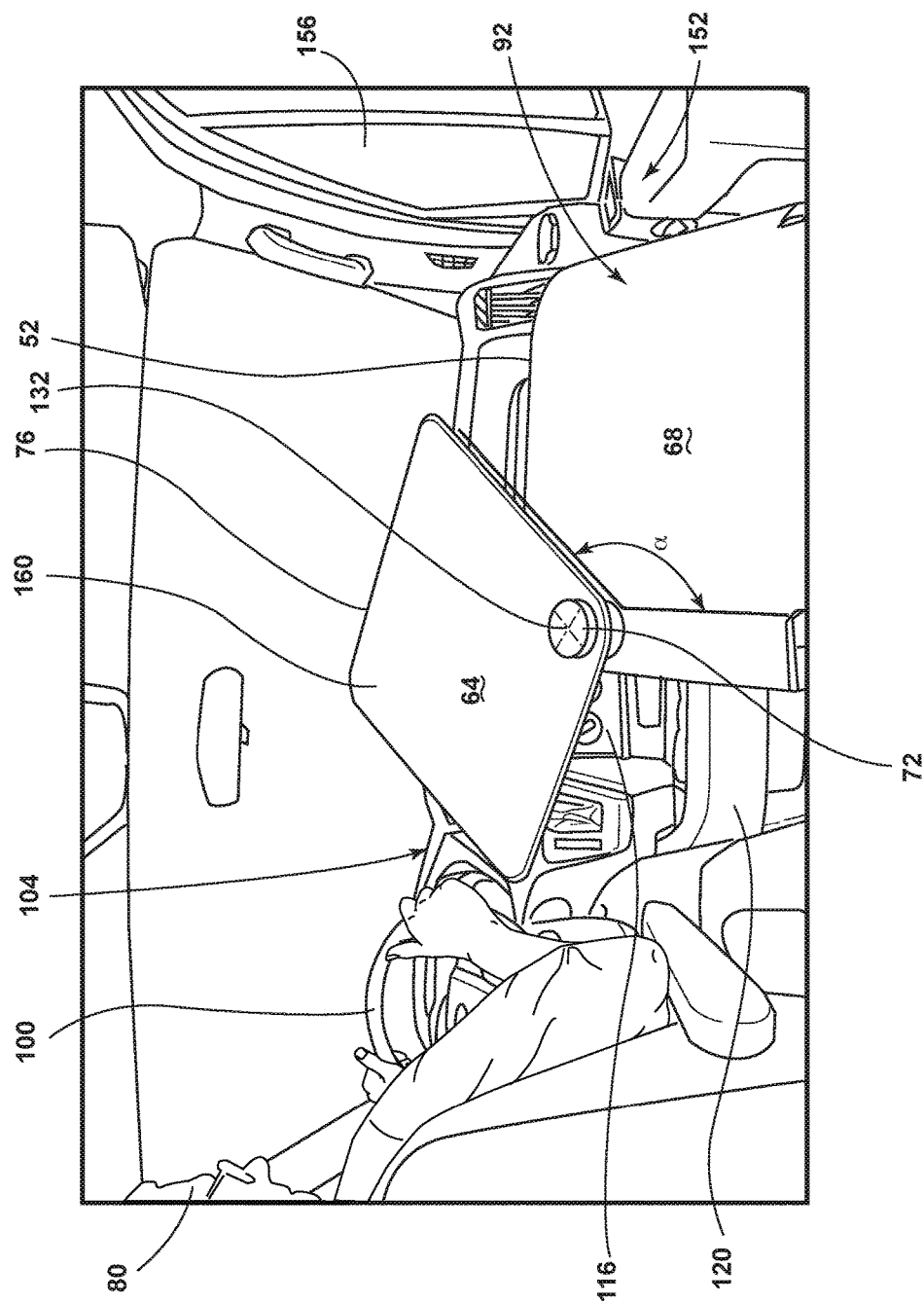
FIG. 10 is an enlarged rear perspective view of one embodiment of the vehicle seat and deployed desk in FIG. 9 with a user occupying the driver seat.
Figure 13:
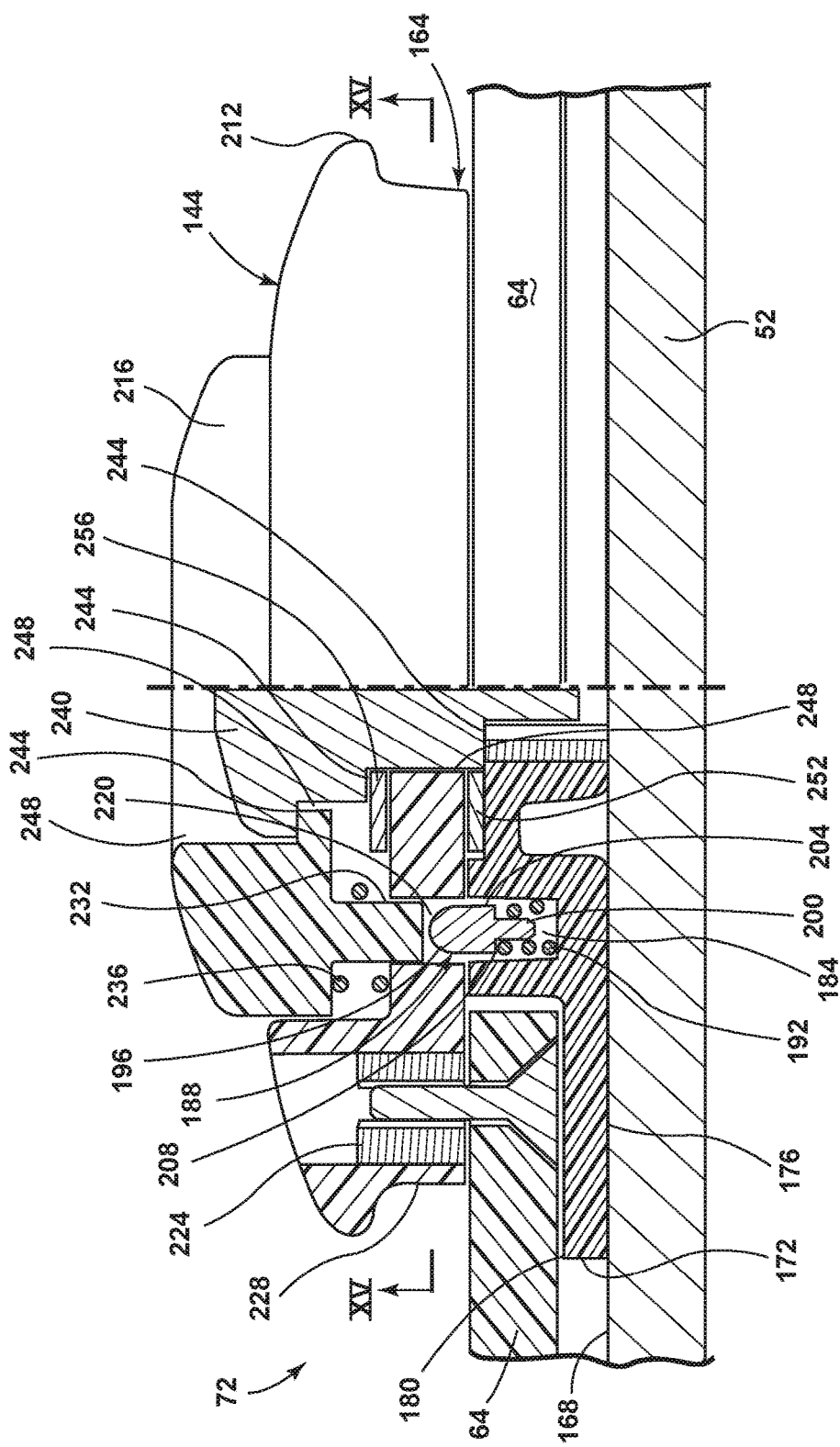
FIG. 13 is a partial cross-sectional side view of one embodiment of the hinge assembly in a locked configuration.
Figure 14:
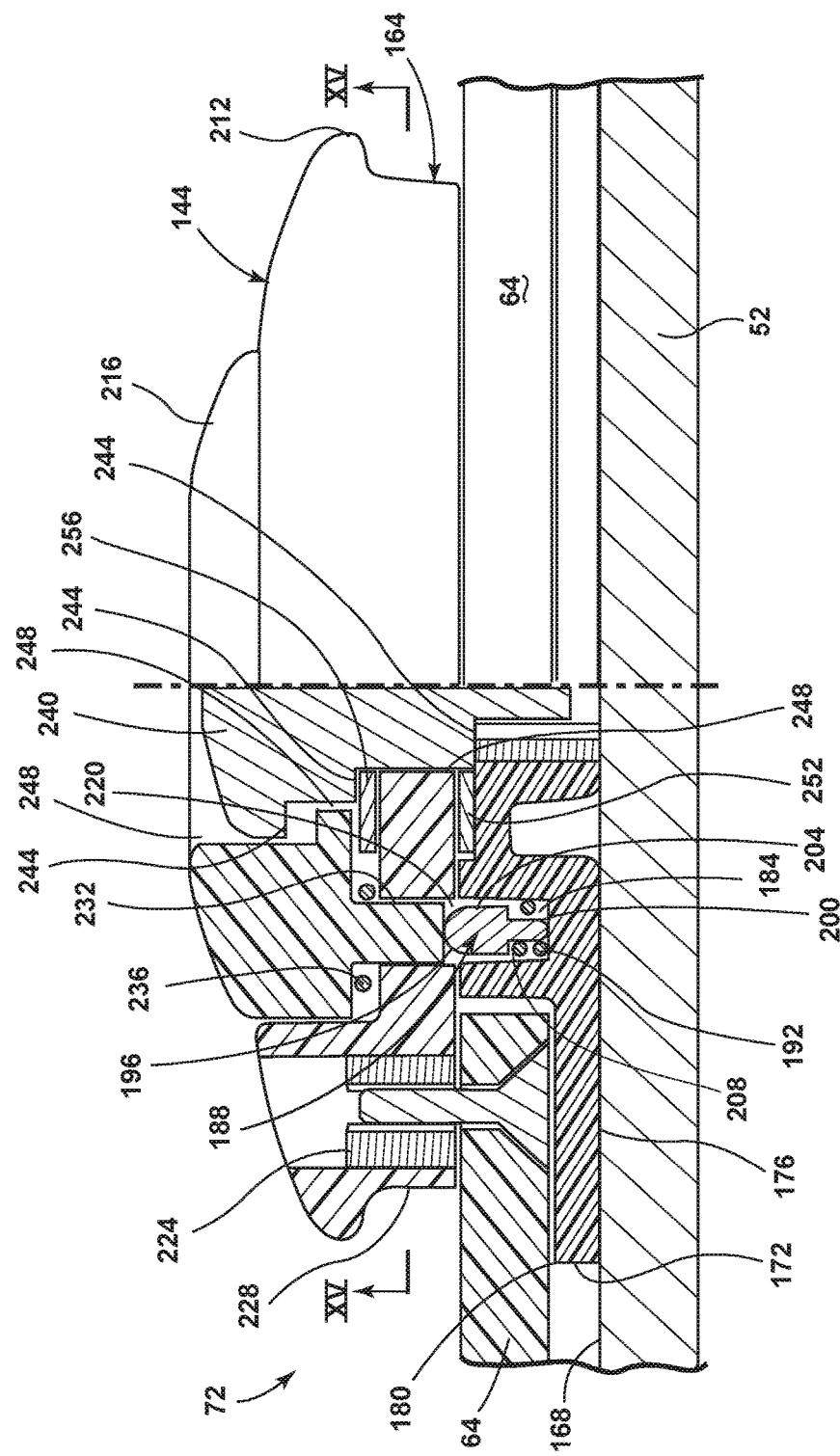
FIG. 14 is a partial cross-sectional side view of one embodiment of the hinge assembly, similar to FIG. 13, with the hinge assembly in an unlocked configuration.

Referring to FIGS. 6-9, one embodiment of the vehicle desk 64 is shown operably connected to the passenger seat 92. The vehicle desk 64 is operably coupled to the rear portion 68 of the seatback 52 of seat 92 by the hinge assembly 72, which can be located at any desired location on the vehicle desk 64 and the seatback 52. Preferably, the hinge assembly 72 operably couples the vehicle desk 64 to the rear portion 68 of the seatback 52 at an upper corner of the vehicle desk 64 that is proximate the user 80, such as the upper left corner (FIG. 10). The hinge assembly 72 permits rotational motion of the vehicle desk 64 about a rotational axis 132 from at least a stowed position 136 (FIG. 8) to the use position 76 (FIG. 9). The hinge assembly 72 can be motorized or manually operated by the user 80. Additionally, the hinge assembly 72 can be self-locking, which means the hinge assembly 72 defaults to a locked configuration that impedes rotational motion of the vehicle desk 64 after the vehicle desk 64 has been placed in the position selected by the user 80. The locked configuration of the hinge assembly 72 can be accomplished, for example, by a self-locking hinge assembly 144 (FIGS. 13 and 14). Other suitable locking mechanisms of the hinge assembly 72 will be appreciated by one of skill in the art.

Figure 6:
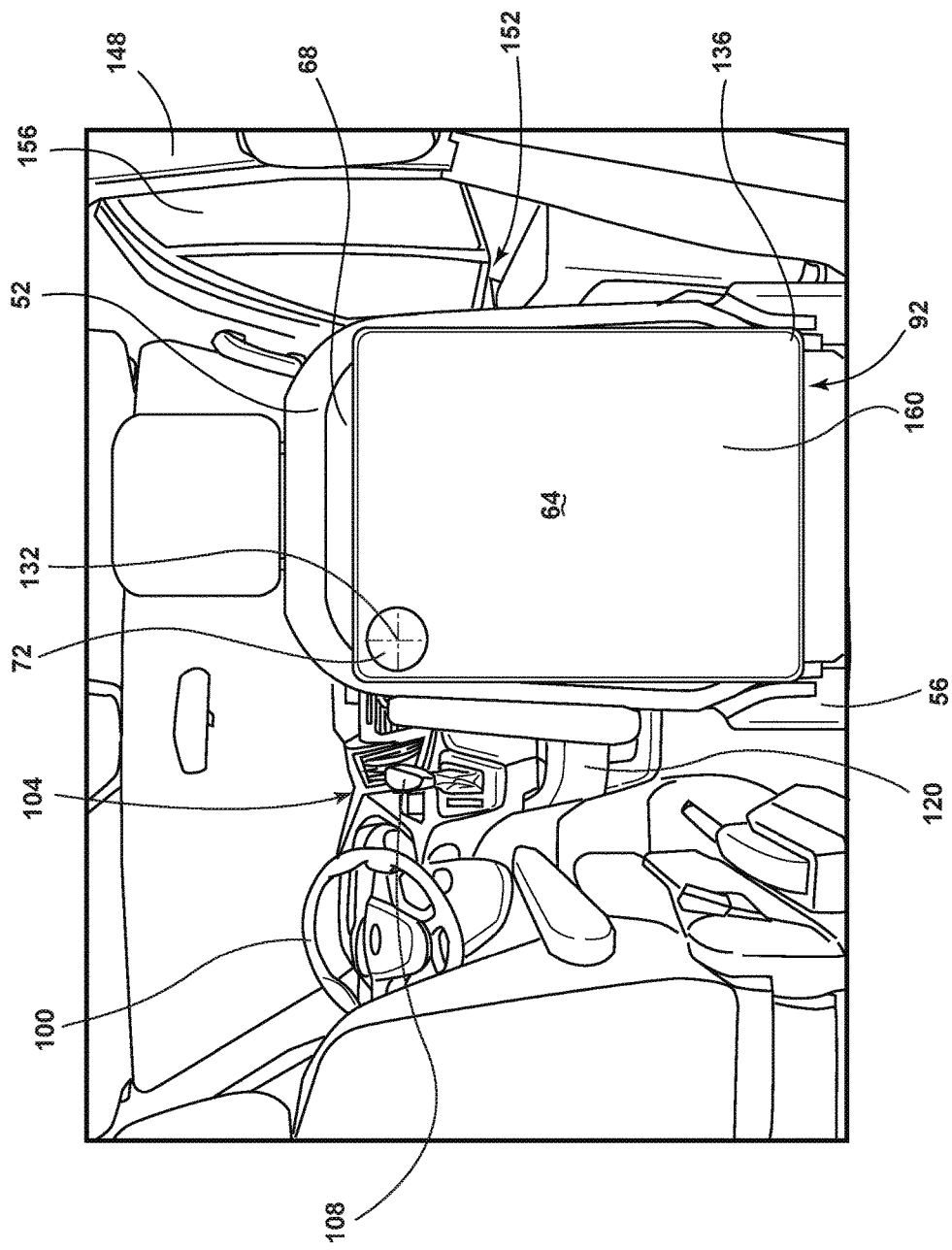
FIG. 6 is a rear perspective view of a vehicle seat in the open position equipped with one embodiment of a passenger seat mounted desk that is in a stowed position.
Figure 11:
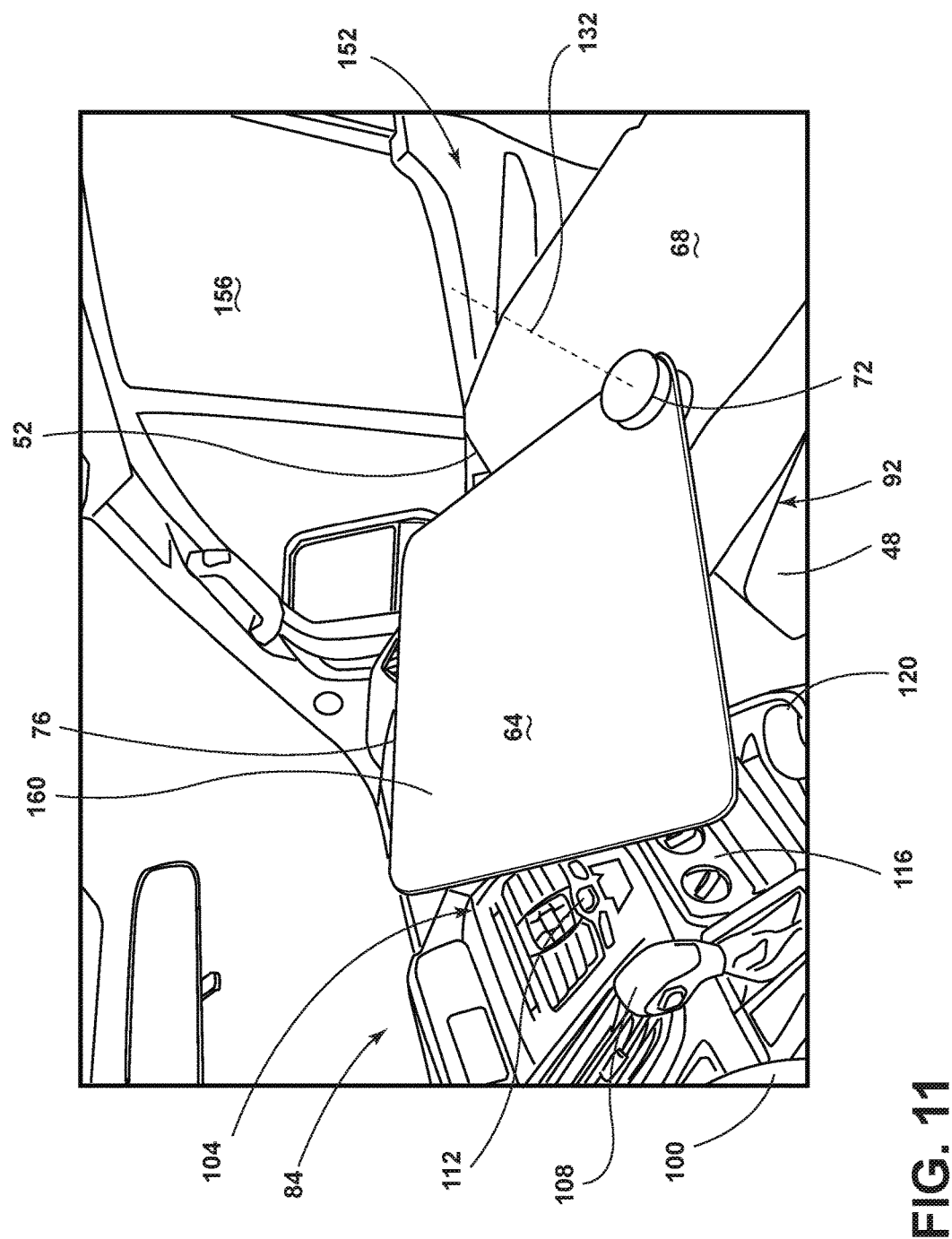
FIG. 11 is a driver perspective view of one embodiment of the passenger seat mounted desk in the deployed, or use, position.
Figure 12:
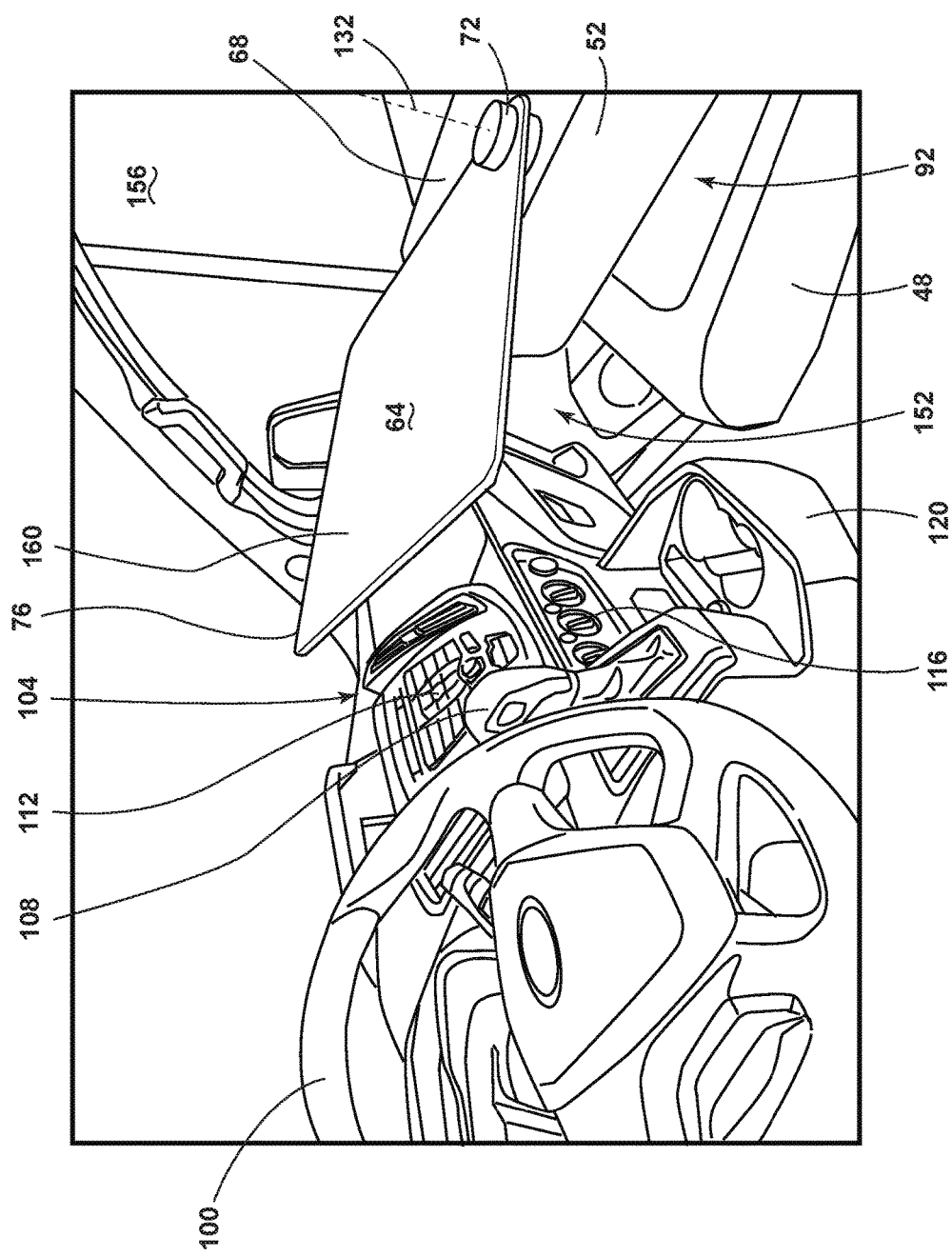
FIG. 12 is a side perspective view of one embodiment of the passenger seat mounted desk of FIG. 11 showing accessibility to the various functionalities of the vehicle.

Referring now to FIGS. 6-12, in one embodiment the vehicle desk 64 can be rotated from the stowed position 136 shown in FIG. 6 to the use position 76 shown in FIG. 10. While in the stowed position 136 the vehicle desk 64 overlaps substantially with the seatback 52. When the user 80 of the vehicle 40 desires to utilize the vehicle desk 64, the user 80 can pivot the seatback 52 forward about the pitch joint 56 to the user-selected pitch angle Φ and rotate the vehicle desk 64 about the hinge assembly 72 to the use position 76. Upon rotation of the vehicle desk 64 into the use position 76, the vehicle desk 64 preferably does not contact other interior components of the vehicle 40, such as, the B-pillar 148, the door assembly 152, the window 156, the dashboard assembly 104, etc. The use position 76 shown in FIG. 10 is a position in which the vehicle desk 64 is presented to a passenger in the vehicle, such as the driver, to utilize the vehicle desk 64. Once in the use position 76, the vehicle desk 64 is presented to the user 80 in an ergonomic fashion. Additionally, while in the use position 76, the vehicle desk 64 does not interfere with the normal operation of the vehicle 40. That is, the vehicle desk 64 can remain in the use position 76 while the vehicle is in motion and the user 80 can maintain access to the steering wheel 100, the shifter 108, the radio controls 112, the climate controls 116, the beverage holding area 120, and the like. Further, the vehicle desk 64 does not impede the line-of-sight of the user 80, as best shown in FIG. 11, and as such, does not create blind spots during vehicle operation.

While the vehicle desk 64, as shown in one embodiment in FIGS. 6-12, is mounted to the passenger seat 92 in the front portion 96 of the vehicle 40, it is contemplated that the vehicle desk 64 can be used elsewhere in the vehicle 40 to provide a working surface 160 for passengers according to other embodiments. While the vehicle desk 64 is shown as a planar working surface, one of skill in the art will readily appreciate various modifications that can be made to the vehicle desk 64 as shown. For example, the vehicle desk 64 can include a drawer, a recessed area to hold a drink container and/or writing utensils, a retention member that secures documents or other items to the working surface 160 of the vehicle desk 64, and/or any other modification that facilitates access to items the user 80 wishes to keep within reach.

Referring now to FIGS. 13-16, one embodiment of the hinge assembly 72 is shown in further detail. The vehicle seating assembly 44 (FIG. 1) includes, but is not limited to, the seatback 52 and the hinge assembly 72 for allowing the desk 64 to pivot relative to the seatback 52 and locking the desk 64 in a selectable position. The hinge assembly 72 includes a finger-grip rotator knob assembly 164 that is movable between at least the stowed position 136 (FIG. 7) and the use position 76 (FIG. 9). The hinge assembly 72 is operably coupled to a mounting surface 168 of the seatback 52, for example, by a mounting plate 172. The coupling between the hinge assembly 72 and the mounting plate 172 is accomplished by at least one fastener, such as, but not limited to, screws, bolts, nails, welding, rivets, adhesives, magnets, and the like. The mounting plate 172 has a first side 176 operably coupled to the seatback 52 and a second side 180 operably coupled to the hinge assembly 72. The vehicle desk 64 is operably coupled to the hinge assembly 72 and is disposed between the second side 180 of the mounting plate 172 and the hinge assembly 72.

Referring specifically to FIGS. 13 and 14, one embodiment of the hinge assembly 72 is shown as a self-locking hinge assembly 144 in a partial cross-sectional view. The hinge assembly 72 is spring-loaded and operably coupled to the mounting surface 168 of the seatback 52 by the mounting plate 172. According to one embodiment, the first side 176 of the mounting plate 172 is operably coupled to the mounting surface 168 of the seatback 52 by at least one fastener (not shown). Suitable fasteners will be recognized by one of skill in the art and include, but are not limited to, screws, bolts, nails, welding, rivets, adhesives, magnets, and the like. Alternatively, the mounting plate 172 can be integrally formed with the seatback 52. The second side 180 of the mounting plate 172 is operably coupled to the hinge assembly 72 by at least one fastener (not shown). Suitable fasteners will be recognized by one of skill in the art and include, but are not limited to, screws, bolts, nails, welding, rivets, adhesives, magnets, and the like. Preferably, the hinge assembly 72 is coupled to the second side 180 of the mounting plate 172 at a point that permits rotation of the hinge assembly 72. For example, coupling of the hinge assembly 72 to the second side 180 of the mounting plate 172 can be accomplished at a geometric center of the hinge assembly 72.

The second side 180 of the mounting plate 172 includes a plurality of recesses 184 that each receives a corresponding locking pin 188 and a biasing member, such as a locking pin spring 192. The locking pin spring 192 biases the locking pin 188 to a raised position or condition (FIG. 13) with a spring bias force. While the locking pin spring 192 is shown as a compression or coil spring, one of skill in the art will recognize that the present disclosure is not so limited and other springs or biasing members can be used in alternative embodiments without departing from the concepts disclosed herein. For example, a wave spring can be used as the locking pin spring 192 and can be positioned either above or below the locking pins 188. The locking pins 188 have a first end 196 that is substantially concave and a second end 200 that has a diameter that is smaller than the diameter of a body 204 of the locking pin 188. The second end 200 of the locking pin 188 can be inserted into the locking pin spring 192 while the body 204 of the locking pin 188 rests on an upper end 208 of the locking pin spring 192.

The finger-grip rotator knob assembly 164, in one embodiment, includes a finger-grip rotator knob 212 and a pressure-actuated lock release 216, such as a palm-actuated lock release. The finger-grip rotator knob 212 includes a plurality of apertures 220 that are configured to permit actuation of the locking pins 188 therethrough. The finger-grip rotator knob 212 further includes at least one fastener receiving member 224 located proximal to a peripheral edge 228 of the finger-grip rotator knob 212. The finger-grip rotator knob 212 receives the pressure-actuated lock release 216. The pressure-actuated lock release 216 includes a plurality of lock release protrusions 232 that are each ensheathed by a biasing member, such as a lock release spring 236, which thereby biases the pressure-actuated lock release 216 to a raised position or condition (FIG. 13). While the lock release spring 236 is shown as a compression or coil spring, one of skill in the art will recognize that the present disclosure is not so limited and other springs or biasing members can be used in alternative embodiments without departing from the concepts disclosed herein. For example, a wave spring can be used as the lock release spring 236 and can be positioned between the finger-grip rotator knob 212 and the pressure-actuated lock release 216. In such an alternative embodiment, the wave spring can be positioned radially outward of the lock release protrusions 232. Alternatively, the wave spring can be positioned radially inward of the lock release protrusions 232. The plurality of lock release protrusions 232 are configured to correspond with and pass through the plurality of apertures 220 in the finger-grip rotator knob 212, such that actuation of the locking pins 188 can be achieved. The locking pin springs 192 bias the locking pins 188 in a raised condition (FIG. 13), which provides the hinge assembly 72 in a locked configuration.

Referring still further to FIGS. 13 and 14, the finger-grip rotator knob assembly 164 is operably coupled to the second side 180 of the mounting plate 172 by an axial retaining shoulder fastener 240. The axial retaining shoulder fastener 240 includes at least one shoulder 244 that retains elements of the hinge assembly 72 that are separate from one another, such as the finger-grip rotator knob 212 and the pressure-actuated lock release 216. The axial retaining shoulder fastener 240 operably couples the finger-grip rotator knob assembly 164 to the mounting plate 172 of the seatback 52 by passing through a series of openings 248 in the finger-grip rotator knob assembly 164 and engaging with the mounting plate 172. Disposed between the mounting plate 172 and the finger-grip rotator knob assembly 164 and proximal to the axial retaining shoulder fastener 240 is a bearing washer 252. The bearing washer 252 aides in reducing friction during operation of the hinge assembly 72 and allows for tolerance variations during the manufacturing process. It is contemplated that an alternative embodiment of the assembly could forgo the use of the bearing washer 252 and have the finger-grip rotator knob assembly 164 travel on the second side 180 of the mounting plate 172 without departing from the concepts disclosed herein. A retaining washer 256 is disposed between the finger-grip rotator knob 212 and one of the shoulders 244 of the axial retaining shoulder fastener 240, which secures the finger-grip rotator knob 212 in a vertical stationary position. The pressure-actuated lock release 216 is secured to the hinge assembly by being disposed below another one of the shoulders 244 of the axial retaining shoulder fastener 240. Sufficient space is provided between the shoulder 244 of the axial retaining shoulder fastener 240 and the retaining washer 256 to permit the pressure-actuated lock release 216 to actuate the locking pins 188 between a raised condition (FIG. 13) and a lowered condition (FIG. 14). The substantially concave shape of the first end 196 of the locking pins 188 aides in the rotatable nature of the hinge assembly 72. That is, by having the first end 196 of the locking pins 188 substantially concave, the locking pins 188 do not bind the hinge assembly 72 when the user 80 is attempting to rotate the hinge assembly 72. This provides for less strict tolerances in the manufacturing process by ensuring that in the event that the plurality of lock release protrusions 232 do not fully actuate the locking pins 188, then the rotation of the finger-grip rotator knob 212 can actuate the locking pins 188 the remaining distance to the lowered condition (FIG. 14).

Figure 7:
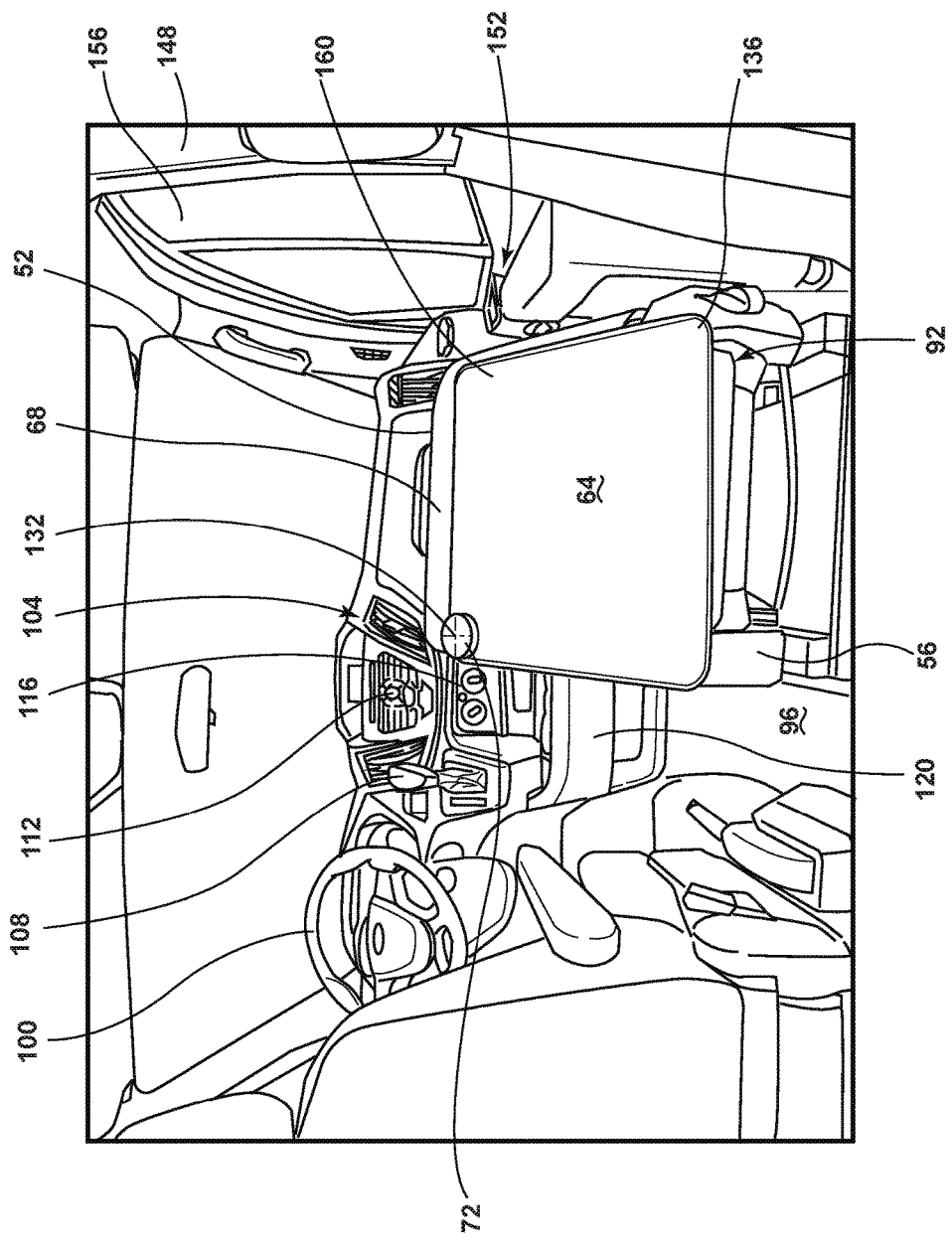
FIG. 7 is a rear perspective view of the vehicle seat in the forward-pitched position equipped with one embodiment of the passenger seat mounted desk that is in the stowed position.
Figure 8:
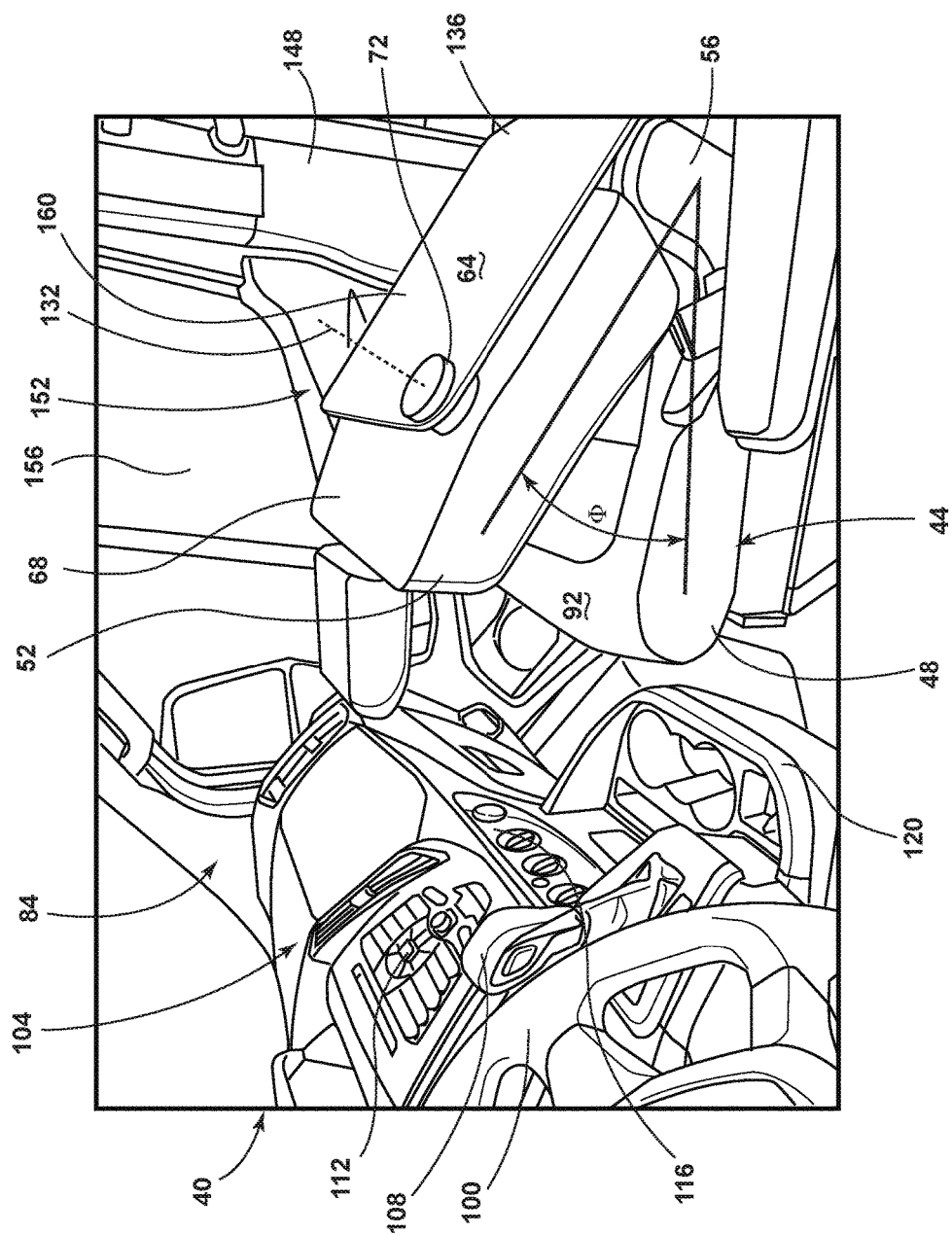
FIG. 8 is a side perspective view of the vehicle seat in the forward-pitched position equipped with one embodiment of the passenger seat mounted desk that is in the stowed position.
Figure 15:
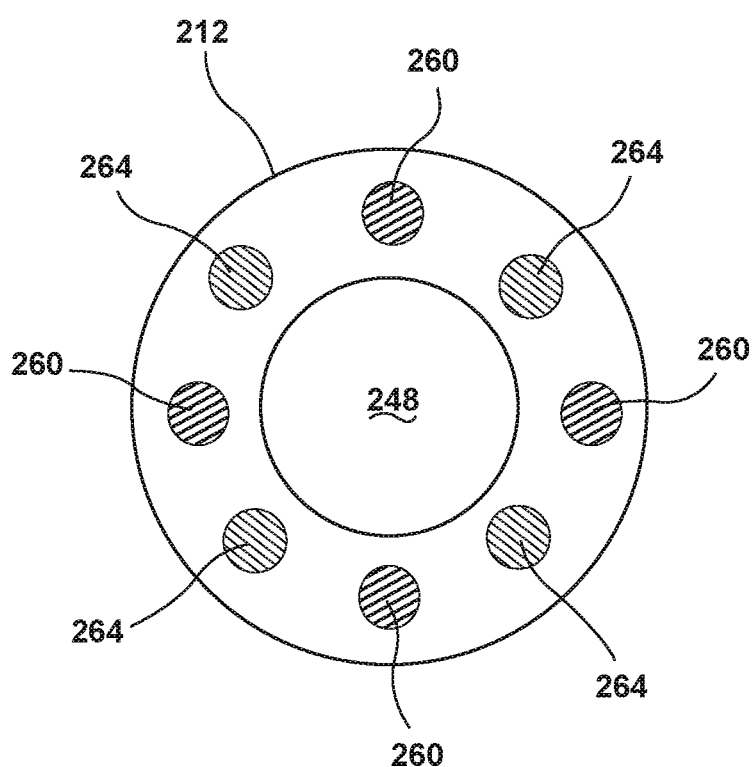
FIG. 15 is a cross-sectional view of one embodiment of the finger-grip rotator knob taken along line XV-XV of FIG. 14.

Referring now to FIG. 15, a cross-sectional view of the finger-grip rotator knob 212 shows the configuration of the plurality of apertures 220 according to one embodiment. The plurality of apertures 220 (FIGS. 13 and 14) provide meshing points for the hinge assembly 72 (FIGS. 13 and 14) that facilitate a locked configuration of the hinge assembly 72. As shown, there are eight apertures 220 in the finger-grip rotator knob 212, however the present disclosure is not so limited and one of skill in the art will recognize that other configurations, shapes, and number of apertures are possible without departing from the concepts disclosed herein. In the embodiment shown, four of the eight apertures 220 are stowed position apertures 260 that correspond to a position of the hinge assembly 72 that provides the vehicle desk 64 in the stowed position 136 (FIG. 7). The remaining four apertures 220 are use position apertures 264 that correspond to a position of the hinge assembly 72 that provides the vehicle desk 64 in the use position 76 (FIG. 9). While shown as alternating between the stowed position apertures 260 and the use position apertures 264 when moving circumferentially around the hinge assembly 72, it is contemplated that other configurations and orientations can be used without departing from the concepts disclosed.

Figure 16:
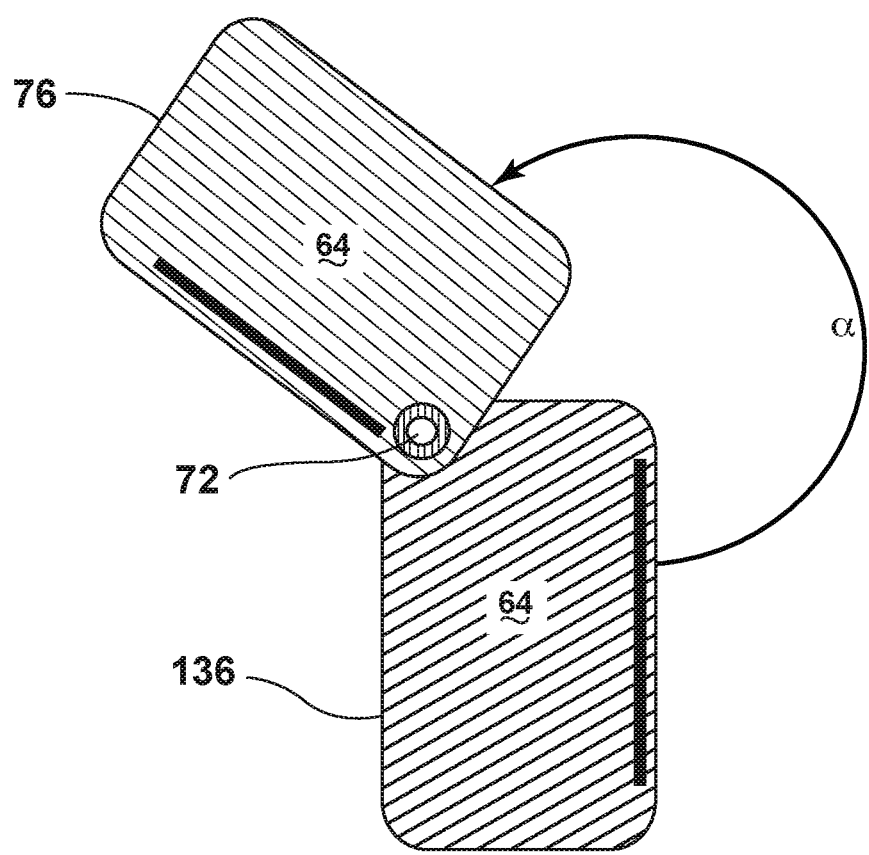
FIG. 16 is a top view of one embodiment of the vehicle desk rotating from a stowed position to a use position.

Referring now to FIG. 16, the vehicle desk 64 is shown pivoting about hinge assembly 72 from the stowed position 136 to the use position 76 through a rotational angle α. The embodiment shown in FIG. 16 shows the rotational angle α as being approximately one hundred and thirty five degrees (135°) counter-clockwise; however, the vehicle desk 64 may have other rotational angles and in one embodiment, the vehicle desk 64 may rotate at least forty-five degrees (45°) between the use position 76 and the stowed position 136. One of skill in the art will recognize that the rotational angle α can be any angular rotation value that provides the vehicle desk 64 in the use position 76, such that the user 80 of the vehicle 40 can utilize the functionality of the vehicle desk 64. Additionally, the hinge assembly 72 can be configured to provide meshing points that facilitate locking configurations at fixed angular increments, such as about five degree (5°) intervals. Further, while the vehicle desk 64 is shown as rotating in a counter-clockwise fashion to provide the vehicle desk 64 in the use position 76, it is contemplated that the vehicle desk 64 can rotate in a clockwise fashion to provide the vehicle desk 64 in the use position 76 without departing from the concepts disclosed herein.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

It will be understood by one having ordinary skill in the art that construction of the described invention, and other components, is not limited to any specific material. Other exemplary embodiments of the invention disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the invention, as shown in the exemplary embodiments, is illustrative only. Although only a few embodiments of the present innovations have been described in detail in this invention, those skilled in the art who review this invention will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further, it is to be understood that such concepts are intended to be covered by the following claims, unless these claims, by their language, expressly state otherwise.

What is claimed is:
1. A hinge assembly comprising:
a finger-grip rotator knob assembly;

a mounting plate having a first side operably coupled to a mounting surface and a second side of the mounting plate operably coupled to the finger-grip rotator knob assembly; and a movable element disposed between the finger-grip rotator knob assembly and the mounting plate, wherein the movable element is operably coupled to, and rotatable with, the finger-grip rotator knob assembly.

2. The hinge assembly of claim 1, wherein the finger-grip rotator knob assembly further comprises a finger-grip rotator knob, a pressure-actuated lock release having a plurality of lock release protrusions that extend downwardly from the pressure-actuated lock release, a plurality of lock release springs, and the lock release protrusions each sheathed by one of the lock release springs.

3. The hinge assembly of claim 2, wherein the second side of the mounting plate includes a plurality of recesses that each receives a locking pin and a locking pin spring, and wherein the locking pin spring engages with the locking pin to provide a biasing force to the locking pin.

4. The hinge assembly of claim 3, wherein the pressure-actuated lock release is movable between a raised condition and a lowered condition, wherein the raised condition provides a locked configuration of a self-locking hinge assembly and the lowered condition provides an unlocked configuration of the self-locking hinge assembly, and wherein the locked configuration is achieved by an interference fit provided by the locking pins.

5. The hinge assembly of claim 4, wherein the raised condition of the pressure-actuated lock release provides the locking pins in a raised condition as a result of the extension of the locking pin springs, thereby providing the interference fit and preventing rotational motion of the self-locking hinge assembly.

6. The hinge assembly of claim 5, wherein the lowered condition of the pressure-actuated lock release provides the locking pins in the lowered condition as a result of the lock release protrusions actuating the locking pins to compress the locking pin springs such that rotational motion of the self-locking hinge assembly is permitted.

7. A seating assembly comprising:
a seatback;
a mounting plate having a first side operably coupled to the seatback and a second side of the mounting plate operably coupled to a hinge assembly, wherein the hinge assembly includes a finger-grip rotator knob assembly; and
a desk disposed between the second side of the mounting plate and the hinge assembly, wherein the desk is operably coupled to the hinge assembly.

8. The seating assembly of claim 7, wherein the hinge assembly is movable between at least a stowed position and a use position.

9. The seating assembly of claim 7, wherein the second side of the mounting plate includes a plurality of recesses that each receives a locking pin and a locking pin spring, and wherein the locking pin spring engages with the locking pin to provide a biasing force to the locking pin.

10. The seating assembly of claim 9, wherein the finger-grip rotator knob assembly further comprises a finger-grip rotator knob, a pressure-actuated lock release having a plurality of lock release protrusions that extend downwardly from the pressure-actuated lock release, a plurality of lock release springs, and the lock release protrusions each sheathed by one of the lock release springs.

11. The seating assembly of claim 10, wherein the pressure-actuated lock release is movable between a raised condition and a lowered condition, wherein the raised condition provides a locked configuration of a self-locking hinge assembly and the lowered condition provides an unlocked configuration of the self-locking hinge assembly, and wherein the locked configuration is achieved by an interference fit provided by the locking pins.

12. The seating assembly of claim 11, wherein the raised condition of the pressure-actuated lock release provides the locking pins in a raised condition as a result of the extension of the locking pin springs, thereby providing the interference fit and preventing rotational motion of the self-locking hinge assembly.

13. The seating assembly of claim 12, wherein the lowered condition of the pressure-actuated lock release provides the locking pins in the lowered condition as a result of the lock release protrusions actuating the locking pins to compress the locking pin springs such that rotational motion of the self-locking hinge assembly is permitted.

14. A vehicle seating assembly comprising:
a seatback;
a hinge assembly comprising a finger-grip rotator knob assembly that is movable between at least a stowed position and a use position;
a mounting plate having a first side operably coupled to the seatback and a second side of the mounting plate operably coupled to the hinge assembly; and
a desk operably coupled to the hinge assembly and disposed between the second side of the mounting plate and the hinge assembly.

15. The seating assembly of claim 14, wherein the second side of the mounting plate includes a plurality of recesses that each receives a locking pin and a locking pin spring, and wherein the locking pin spring engages with the locking pin to provide a biasing force to the locking pin.

16. The seating assembly of claim 15, wherein the finger-grip rotator knob assembly further comprises a finger-grip rotator knob, a pressure-actuated lock release having a plurality of lock release protrusions that extend downwardly from the pressure-actuated lock release, a plurality of lock release springs, and the lock release protrusions each sheathed by one of the lock release springs.

17. The seating assembly of claim 16, wherein the pressure-actuated lock release is movable between a raised condition and a lowered condition, wherein the raised condition provides a locked configuration of a self-locking hinge assembly and the lowered condition provides an unlocked configuration of the self-locking hinge assembly, and wherein the locked configuration is achieved by an interference fit provided by the locking pins.

18. The seating assembly of claim 17, wherein the raised condition of the pressure-actuated lock release provides the locking pins in the raised condition as a result of the extension of the locking pin springs, thereby providing the interference fit and preventing rotational motion of the self-locking hinge assembly.

19. The seating assembly of claim 18, wherein the lowered condition of the pressure-actuated lock release provides the locking pins in the lowered condition as a result of the lock release protrusions actuating the locking pins to compress the locking pin springs such that rotational motion of the self-locking hinge assembly is permitted.

20. The vehicle seating assembly of claim 15, further comprising:
a first end and a second end of the locking pins;
the first end of the locking pins being substantially concave; and the second end of the locking pins having a diameter that is smaller than the diameter of a body of the locking pins, such that the second end of the locking pin can be inserted into the locking pin spring while the body of the locking pin rests on an upper end of the locking pin spring.

* * * * *